Nov. 1, 1949.　　　　C. G. KRIEGER　　　　2,486,423
COMBINED FRUIT REAMER AND STRAINER
Filed Oct. 6, 1945
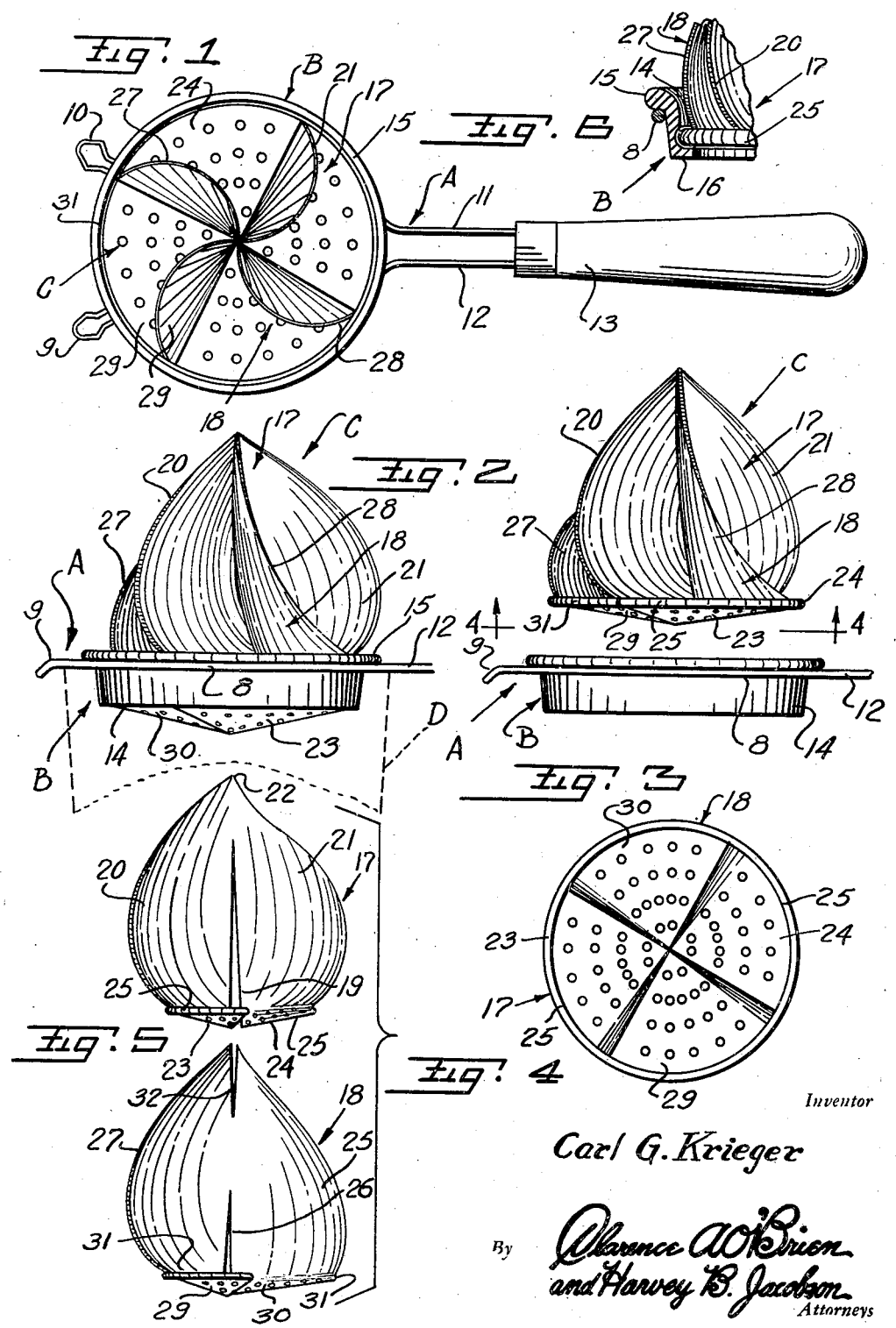
Inventor
Carl G. Krieger
By Clarence A. O'Brien
and Harvey B. Jacobson
Attorneys Patented Nov. 1, 1949

2,486,423

UNITED STATES PATENT OFFICE 2,486,423

COMBINED FRUIT REAMER AND STRAINER

Carl G. Krieger, Mason City, Iowa

Application October 6, 1945, Serial No. 620,798

2 Claims. (Cl. 146—3)

The present invention relates to a so-called household kitchen accessory such as is applicable to a drinking glass or other receptacle and which is constructed to ream and extract pulp and juice from fruit, in a well-known manner.

Specifically, the preferred embodiment of the invention comprises a handle-equipped wire or equivalent frame, this being adapted to sit horizontally on the mouth of the glass, the main part of the frame serving to support what may be called an adapter ring, and the latter being constructed to accommodate an insertable and removable fruit pulp and juice reamer, said reamer being of general conical form.

One object of the invention is to provide a holder unit characterized by the aforementioned frame and fashioned from suitably bent wire, this being provided on one side with outstanding fingers to rest on the lip of the glass, being provided on an opposite diametrically opposed side with portions to accommodate a handle.

Another object of the invention pertains to the aforementioned handle-equipped frame and the associated adapter ring or annulus, the latter comprising a rim with an outstanding bead to seat on said frame, said rim being also provided at its bottom with an inturned flange forming a supporting ledge for a strainer-equipped reamer unit.

Another object has to do with the adoption and use of the combined reamer and strainer forming said pulp and juice reamer.

A still further object of the invention has to do with the adoption and use of a combination strainer and reamer in which the component parts are of sectional form and are adapted to be assembled in separable, properly nested relationship.

Other objects, features and advantages of the invention will become more readily apparent from the following description and the accompanying illustrative drawing.

In the drawings, wherein like numerals are employed to designate like parts throughout the views:

Figure 1 is a top plan view of the complete assemblage whose complemental parts are constructed in accordance with the principles of the instant invention.

Figure 2 is a side elevational view with the handle removed for clearness of illustration, this showing the manner in which the parts are assembled and placed on a juice retrieving glass or the like.

Figure 3 is a view like Figure 2 showing the combined strainer and reamer unit lifted up above the adapter ring.

Figure 4 is a bottom plan view of said unit, this view being approximately on the plane of the line 4—4 of Figure 3, looking in the direction of the arrows.

Figure 5 is an elevational view showing the two companion sections or parts which go to make up the strainer-equipped unit.

Figure 6 is an enlarged fragmentary detail section through the essential portions of the device to bring out the adaptable association and relation thereof.

Referring now to the drawings by distinguishing reference characters, it will be observed that the aforementioned "assemblage" is actually made up of three complemental parts, namely, the handle-equipped frame unit A, the annular adapter, unit B, which is removably applicable to the unit A, and the strainer-equipped reamer unit B, the latter removably supported in the adapter unit B.

The unit A comprises a ring-like frame 8 having a pair of suitably shaped and bent supporting and retaining fingers 9 and 10, these being circumferentially spaced apart and being substantially diametrically opposite to spaced, parallel wire-ends 11, the latter forming a suitable shank and being attached to an appropriate wooden or equivalent handgrip 13. The parts 11, 12 and 13 form a handle for the frame and the frame is partly supported by the handle on one side and the substantially diametrically opposite fingers 9 and 10 on the opposite side. The method of accomplishing this is brought out in Figure 2 wherein the parts are placed upon a glass or equivalent receptacle D.

The adapter B comprises an annulus or rim of ringlike form, this being specifically denoted by the numeral 14. It embodies a lip or bead 15 which is at the top and which projects outwardly, as shown in Figure 6, to serve as a suitable assembling and retaining element when brought to bear on said frame 8. At its bottom, the rim includes an inturned flange 16 and this constitutes a ledge which appropriately supports the removable sectional reamer-strainer unit C.

The last-named unit C is preferably constructed of sheet metal or equivalent stock and is also, generally speaking, of conical form, the cone portion being made up of reaming and cutting blades and these being integral with the strainer, the strainer being substantially disk-like and concave in form and being adapted to rest removably on the ledge 16. More specifically, the reamer is made up of four circumferentially spaced, properly curved, spiralling cutting blades. In fact, and as better brought out in Figure 5, said unit C embodies a pair of complemental, separable sections 17 and 18. In side elevational view, these sections appear to be somewhat pear-shaped in general appearance. The section 17 is provided with a central, V-shaped slot 19 which defines individual fins 20 and 21, the fins being properly dished and curved according to requirements of the needed twists and auger effects. The section 17 has its upper pinnacle portion pointed, as at 22, for easy penetration of the fruit (not shown). The basal portions of the fins or cutting blades 20 and 21 are fashioned into laterally bent segmental-shaped elements 23 and 24, and these are slightly dished and apertured to provide strainer portions. The outer marginal edges are rolled into reinforcing beads 25. The section 18 is also provided at its bottom with a V-shaped notch 26 defining cutter blades or fins 27 and 28, these having segmental or sector-shaped strainer elements 29 and 30 with reinforcing marginal beads 31. The upper portion of the section or part 18 is provided with an assembling notch 32 and the slot 19 slips down into this notch in order to assemble the two parts 17 and 18 into the conical form shown in the drawings. The two parts 17 nest properly together and all of the strainer elements 23, 24, 29, and 30 into proper assembled relationship as shown in Figure 4. Hence, we have a combined reamer and strainer unit made up of separable, interfitting sections.

In practice, the part 17 is slipped down over the part 18 with the notch or slot 19 engaging into the notch 32. This constitutes the main assembly step. Then, secondly, the parts 17 and 18 are axially and bodily rotated, one in relation to the other, in order to bring the respective blade portions into intersecting relationship, as brought out in Figure 1. This also permits the apertured strainer elements to fall into proper, complemental strainer-forming relationship.

It is thought that persons skilled in the art to which the invention relates will be able to obtain a clear understanding of the invention after considering the description in connection with the drawings. Therefore, a more lengthy description is regarded as unnecessary.

Minor changes in the shape, size and arrangement of details coming within the field of invention claimed may be resorted to in actual practice, if desired.

I claim:

1. A fruit coring reamer-strainer device comprising a support adapted to rest on the brim of a juice collecting receptacle or the like, an annular strainer rim, said rim being provided with an outstanding lip-forming bead, said bead resting on said support, said rim being further provided with an inturned annular flange and said flange constituting a strainer supporting and assembling ledge, a sectional reamer-strainer unit removably supported within the confines of said rim and on said ledge, said unit being sectional and embodying reamer blades, and the complemental sections of said unit being both collapsible and separable.

2. A knockdown-type strainer-reamer construction comprising a pair of duplicate companion sections, one section embodying spirally twisted blades, said blades being provided at their lower ends with outstanding right angularly bent apertured, sector-shaped portions defining strainer elements, the upper apex portion of one section being formed with a centrally located assembling notch, the remaining section also including spirally twisted blades, having corresponding and angularly bent sector-shaped strainer elements at their lower ends, said second section having a V-shaped notch in its bottom and said V-shaped notch being adapted to seat in the first-named notch, whereby to permit said sections to be separably arranged together in crossed relationship.

CARL G. KRIEGER.

REFERENCES CITED

The following references are of record in the file of this patent:

UNITED STATES PATENTS

| Number | Name | Date |
|---|---|---|
| Re. 18,945 | Andrews | Sept. 12, 1933 |
| 870,124 | Persen | Nov. 5, 1907 |
| 1,643,819 | Marshal et al. | Sept. 27, 1927 |
| 1,751,627 | Glenny | Mar. 25, 1930 |
| 1,864,209 | Meeker | June 21, 1932 |
| 2,074,794 | Mantelet | Mar. 23, 1937 |
| 2,081,424 | Daum | May 25, 1937 |
| 2,271,286 | Cheshier | Jan. 24, 1942 |
| 2,316,953 | Hammond | Apr. 20, 1943 |